United States Patent [19]

Bondioli

[11] Patent Number: 5,718,266

[45] Date of Patent: Feb. 17, 1998

[54] TUBULAR COMPONENT FOR TELESCOPIC PROPELLER SHAFT

[76] Inventor: Edi Bondioli, Via Gina Bianchi No.18, 46029 Suzzara, Mantova, Italy

[21] Appl. No.: 657,606

[22] Filed: May 31, 1996

[30] Foreign Application Priority Data

Jun. 7, 1995 [IT] Italy ................. FI95A0128

[51] Int. Cl.⁶ ................................................. F16L 9/18
[52] U.S. Cl. ................. 138/114; 138/111; 138/103; 138/177
[58] Field of Search ................. 138/111–114, 120, 138/103, 177, 178; 285/289, 300; 175/321, 322

[56] References Cited

U.S. PATENT DOCUMENTS 2,476,216  7/1949  Polleau .......................... 248/188.5
4,918,765  4/1990  Harding ......................... 4/661 X

*Primary Examiner*—Patrick Brinson
*Attorney, Agent, or Firm*—McGlew and Tuttle

[57] ABSTRACT

The tubular member for telescopic propeller shafts has a cross-sectional profile with four projections 1, 1 and 3, 3 and respective longitudinal channels 5, 5 and 7, 7; each of the projections has symmetrical outwardly converging walls; and the plane of symmetry X—X of two opposing projections 1, 1 forms an angle of 85° and an angle of 95° with the plane of symmetry Y—Y of the other two opposing projections 3, 3.

9 Claims, 3 Drawing Sheets

TUBULAR COMPONENT FOR TELESCOPIC PROPELLER SHAFT

FIELD AND BACKGROUND OF THE INVENTION

Tubular sections which can be coupled with a sliding action and are torsionally united are very widely used as components of telescopic shafts of mechanical power trains, for example for cardan shafts in agricultural machines and the like.

SUMMARY AND OBJECTS OF THE PRESENT INVENTION

The components according to the invention were designed to avoid the frequent problems associated with the models currently in use. In particular, the risks of seizing are eliminated or at least substantially reduced; correct angular positioning is facilitated, for assembly without risk of errors or undue forcing between the sections or between one tubular component and the socket in the fork of the cardan joint at the end of the shaft; substantial distribution of the loads and pressures is ensured on the contact surfaces for the transmission of angular motion; the plastic deformation between the initial profiles and the final profiles of the cross sections of the tubular components is limited; and other objects and advantages are achieved, which will be evident to persons skilled in the arts required in the production and use of the products in question.

According to the present invention, a tubular member for a telescopic propeller shaft has a cross-section profile forming four projections and corresponding longitudinal channels, each of the projections having symmetrical outwardly converging walls and the plane of symmetry of two opposing projections being inclined at an angle other than 90° to the plane of symmetry of the other two opposing projections.

In practice, the plane of symmetry of two opposing projections forms, with the plane of symmetry of the other two opposing projections, two dihedral angles which differ from each other by 10° or by approximately 10°. More particularly, the plane of symmetry of two opposing projections may form, with the plane of symmetry of the other two opposing projections, an angle of 95° or approximately 95° and an angle of 85° or approximately 85°.

The outer surfaces of the walls of the symmetrical and outwardly converging projections form an angle of 30° or approximately 30° with each other, in a tubular member designed to be an inner member. In a tubular member designed to be an outer member, the inner surfaces of the walls of the symmetrical and outwardly converging projections form an angle of 28°30' or approximately 28°–30' with each other.

In a possible embodiment of a pair of tubular members for the formation of a telescopic propeller shaft, the outer section has an internal diameter across the projections of the order of 47.4 mm and an internal diameter between the bottoms of the channels of the order of 38.5 mm, and the inner surfaces of the walls of the symmetrical and outwardly converging projections again form an angle of the order of 28°30'; the inner section has an external diameter across the projections of the order of 47 mm and an external diameter between the bottoms of the channels of the order of 38 mm, and the outer surfaces of the walls of the symmetrical and outwardly converging projections form an angle of the order of 30°.

In all cases, the angles described above may vary according to the tolerance and the diameter of the shaft. The greater the diameter, the more the angle must decrease below the 30° mentioned above, in order to obtain support over the whole contact surface in transmission conditions.

A telescopic propeller shaft using the tubular sections described will have, in the terminal cardan joint components, sockets capable of holding the sections having the cross sections specified above.

BRIEF DESCRIPTION OF THE DRAWINGS

The invention will be more clearly understood from the description and the attached drawing which shows a non-restrictive practical example of the invention. In the drawing.

DESCRIPTION OF THE PREFERRED EMBODIMENT

Figure 1:
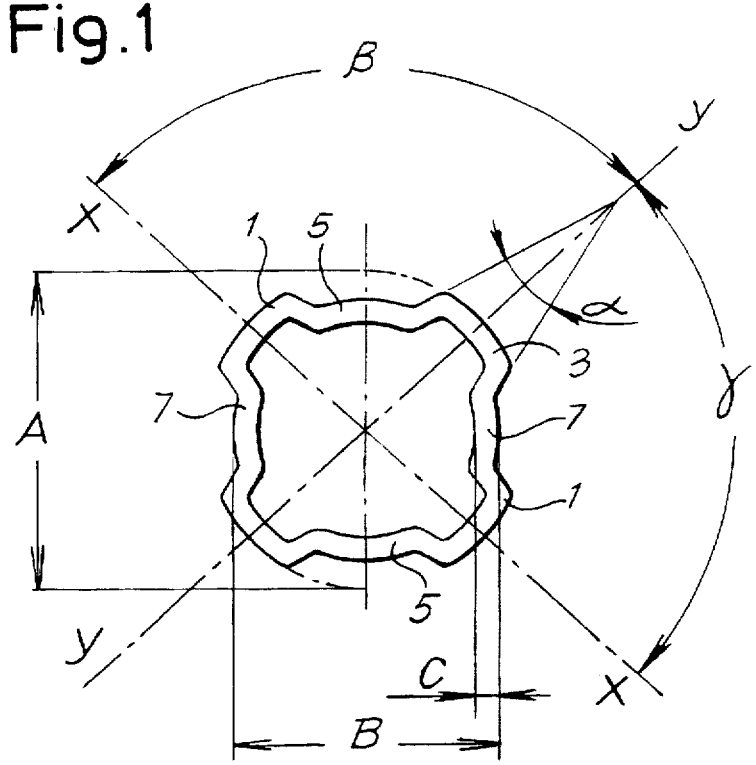
FIG. 1 shows an inner telescopic section.
Figure 2:
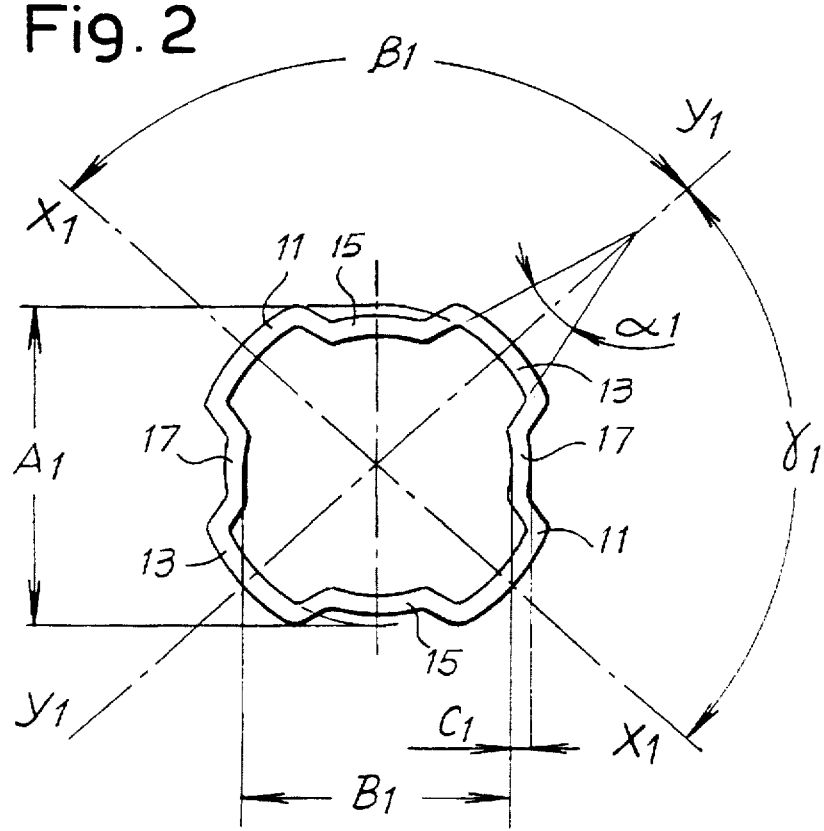
FIG. 2 shows an outer telescopic section.

According to the illustrations in the attached drawing, the cross section shown in FIG. 1 has the configuration of a tubular member for a propeller shaft which is designed to be an inner member, while FIG. 2 shows a tubular member for a propeller shaft which is designed to be the outer member when coupled to the section shown in FIG. 1.

Figure 3:
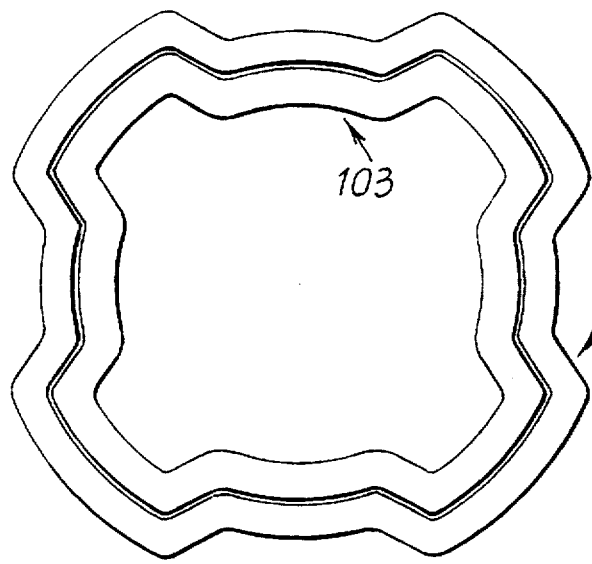
FIG. 3 shows a pair of sections assembled in rest conditions.
Figure 4:
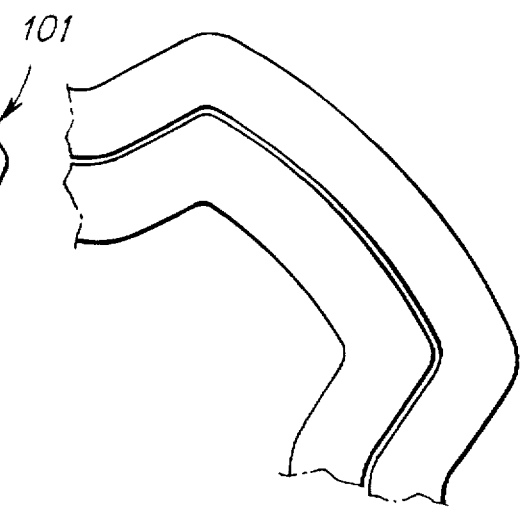
FIG. 4 being an enlarged detail of FIG. 3.

In FIG. 1, the number 1 indicates two diametrically opposing projections and the number 3 indicates two other diametrically opposing projections; said projections are distributed around the perimeter of the illustrated cross section, spaced apart by channels 5 diametrically opposite each other and by channels 7 which are also diametrically opposite each other. The letter A indicates the maximum external diameter, in other words that of the outer profiles of the projections 1 and 3, while B indicates the external diameter of the bottoms of the channels 5 and 7; C indicates the thickness of the tubular section. The values A, B and C may for example be of the order of 47 mm, 38 mm and 3.3 mm. The walls of the projections 1 and 3, which are designed to come into contact with an outer section into which the section shown in FIG. 1 is inserted as shown in FIGS. 3 and 4, have an inclination which forms a combined angle α which may be 30°. X—X indicates the line of the axial plane of symmetry of the projections 1, while Y—Y indicates the axial plane of symmetry of the projections 3. These axial planes of symmetry and their lines X—X and Y—Y form two different angles with each other, indicated by β and γ, which are of the order of 95° and 85° respectively, for example. With this disposition of non-90° angles between the axial places of symmetry marked X—X and YY, it is possible to couple the section in only two positions differing from each other by 180°, this being advantageous for the mounting of a propeller shaft which is telescopic and has cardan joints at the ends.

FIG. 2 shows the cross section of the tubular section of a component designed to form the outer component of a telescopic shaft. This section also has two longitudinal projections 11 diametrically opposite each other and having an axial plane of symmetry marked X1—X1, and two longitudinal projections 13 which are also diametrically opposite each other and whose axial plane of symmetry is marked Y1—Y1 in FIG. 2. The numbers 15 and 17 indicate the corresponding longitudinal channels interposed between the projections 11 and 13. The axial planes of symmetry and their lines X1—X1 and Y1—Y1 form two angles $\beta_1$, $\gamma_1$ which also have values of, for example, 95° and 85°, while the angle $\alpha_1$ between the internal surfaces of the walls delimiting the projections 11 and 13 is of the order of 28°30'. The maximum internal diameter of the projections 11 and 13 is indicated by A1 and is, for example, 47.4 mm, while the corresponding internal diameter at the bottoms of the channels 15 and 17 is indicated by B1 and is, for example, of the order of 38.5 mm.

Figure 5:
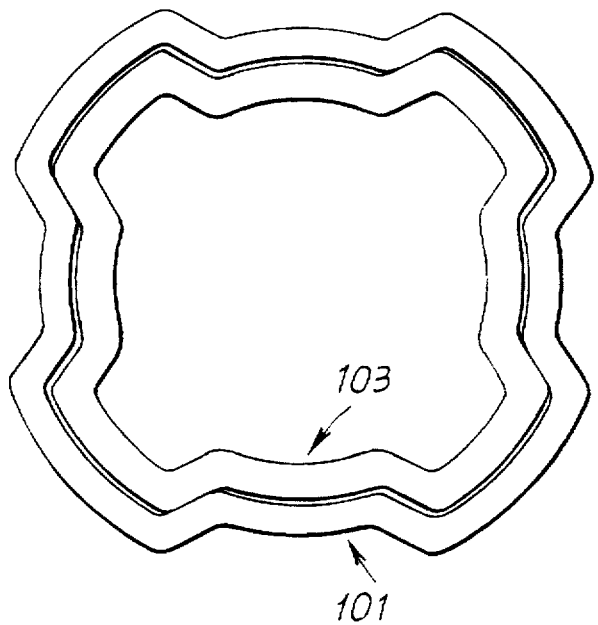
FIGS. 5 and 6 show, similarly to FIGS. 3 and 4, the same coupling in conditions of transmission of drive.
Figure 6:
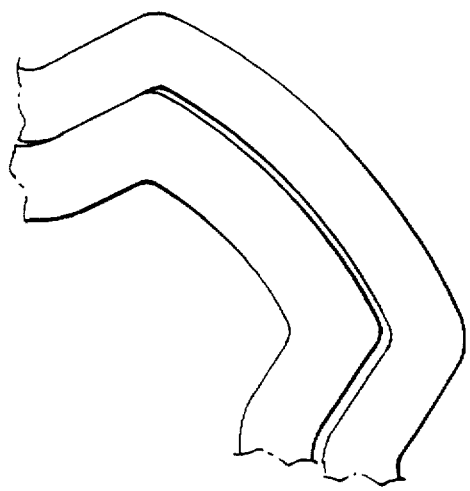
Figure 7:
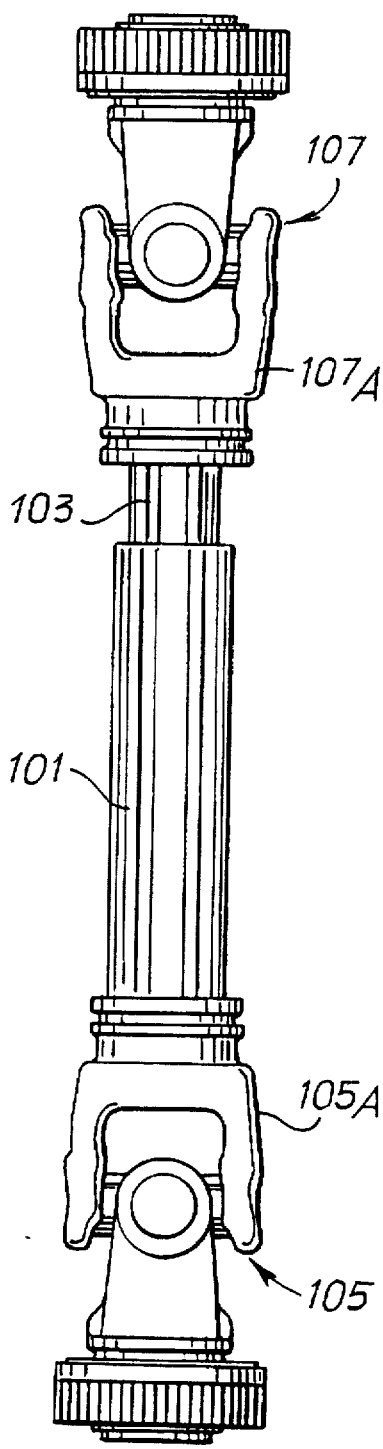
FIGS. 7, 8 and 9 show schematically a telescopic cardan joint of conventional type, made with the components according to the invention, assembled and in its two component parts.
Figure 8:
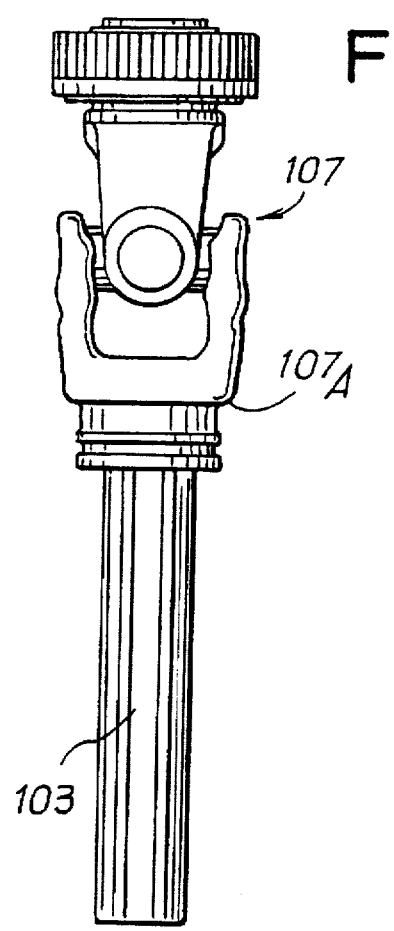
Figure 9:
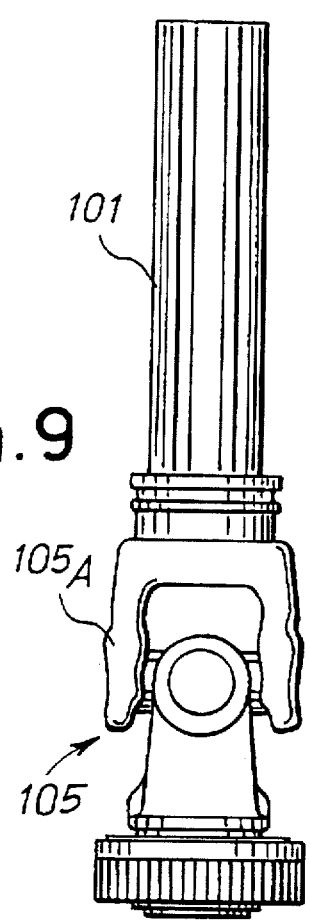

The use of two sections such as those defined in FIGS. 1 and 2 provides a coupling, as clearly seen in FIGS. 3 and 4, to form a telescopic propeller shaft in which the inner and outer tubular members can slide with respect to each other. When no transmission is taking place, the configuration of the two coupled tubular members is theoretically as shown in FIGS. 3 and 4, while in the configuration for angular transmission of drive the two tubular members have the configuration shown in FIGS. 5 and 6, the walls coming into contact in one direction and the opposing walls being spaced further apart than in FIGS. 3 and 4. As a result of the dimensional features, especially those of the characteristic angles stated above, the risks of seizing of a propeller shaft made in this way are reduced and its service life is increased. In the second place, the sizes $\alpha$ and $\alpha_1$ of the angles formed by the outer walls of the inner section and by the inner walls of the outer section (FIGS. 1 and 2 respectively) provide—in the conditions of transmission of angular motion as indicated in FIGS. 5 and 6—a substantially uniform distribution of the pressures between the walls of the two tubular components, with evident advantages which have already been mentioned. Additionally, the difference between the angles $\beta$ and $\gamma$, and between $\beta_1$ and $\gamma_1$, in other words the difference from a 90° distribution between the axial planes of symmetry of the pairs of projections 1 and 3, and 11 and 13, respectively, makes it unnecessary to make excessive changes in the shape of the cross sections of the sections, which would result in an excessive difference of pressures and pressure distribution, and also makes it possible to maintain at all times a clear indication of the position required for coupling together the two tubular members of the telescopic shaft formed by said sections, together with a manifest indication of the angular position of each of the tubular members relative to the corresponding socket which is to receive one end of each of the tubular members in a telescopic cardan shaft in which the forks of the cardan joints must have a specific position with respect to each other, as is clearly shown in FIG. 7, in which the number 101 indicates an outer tubular member and 103 indicates an inner tubular member (see also FIGS. 3 to 6) of a cardan shaft, to which are to be connected, respectively, the component 105A of a terminal cardan joint 105 and a component 107A of a cardan joint 107 joined to the opposite end of the telescopic shaft; the cardan joint 105 is engaged with the tubular member 101 and the cardan joint 107 is engaged with the tubular member 103, and these members must be positioned in a very precise angular disposition in the sockets formed by the two components 105A and 107A respectively, for correct operation of the telescopic cardan shaft as a whole.

In the production of a telescopic shaft, it is possible to make the thickness of the outer tube slightly smaller than that of the inner tube, owing to the larger dimensions of the cross section of the outer tube.

It is to be understood that the drawing shows only an example provided solely as a practical demonstration of the invention, and that this invention may be varied in its forms and dispositions without thereby departing from the scope of the guiding principle of the invention.

I claim:

1. A pair of tubular members for the formation of a telescopic propeller shaft, comprising:

an outer tubular section formed of a wall with a cross-section profile with symetrical and outwardly converging projections and with corresponding longitudinal channels wherein the outer section has an internal diameter across the projections substantially equal to 47.4 mm and an internal diameter between bottoms of said corresponding longitudinal channels substantially equal to 38.5 mm, and the inner surfaces of the walls of the symmetrical and outwardly converging projections form an angle substantially equal to 28°30'; and an inner tubular section formed of a wall with a cross-section profile with projections and with corresponding longitudinal channels, said inner tubular section being arranged telescopingly with respect to said outer tubular section, wherein the inner section has an external diameter across the projections substantially equal to 47 mm and an external diameter between bottoms of said corresponding longitudinal channels substantially equal to 38 mm, and the outer surfaces of the walls of the symmetrical and outwardly converging projections form an angle substantially equal to 30°.

2. A telescopic propeller shaft, comprising:

a first tubular member with a single piece wall with a cross-section profile with a total of four projections and with corresponding longitudinal channels including a first longitudinal channel formed between a first pair of said four projections, a second longitudinal channel formed between a second pair of said four projections, a third longitudinal channel formed between a third pair of said four projections and a forth longitudinal channel formed between a forth pair of said four projections, each of said projections having symmetrical outwardly converging wall portions, a plane of symmetry of two opposing projections being inclined at an angle other than 90° to another plane of symmetry of another two opposing projections;

a second tubular member, said first tubular member and said second tubular member being connected telescopingly with one of said first tubular member and said second tubular member being an inner tubular member and another of said first tubular member and said second tubular member being an outer tubular member, said first outer tubular member and said inner tubular member cooperating to provide a shaft first end and a shaft second end; and a cardan joint connected to one of said shaft first end and said shaft second end, said cardan joint including a socket shaped for receiving said first tubular member cross-sectional profile.

3. A telescopic propeller shaft according to claim 2, wherein said second tubular member has a second tubular member single piece wall with a cross-section profile with a total of four second tubular member projections and with corresponding second tubular member longitudinal channels including a first longitudinal channel formed between a first pair of said four projections, a second longitudinal channel formed between a second pair of said four projections, a third longitudinal channel formed between a third pair of said four projections and a forth longitudinal channel formed between a forth pair of said four projections, each of said projections having symmetrical outwardly converging wall portions, a plane of symmetry of two opposing projections being inclined at an angle other than 90° to another plane of symmetry of another two opposing projections.

4. A telescopic propeller shaft according to claim 2, further comprising:

another cardan joint connected to another of said shaft first end and said shaft second end, said another cardan joint including a socket shaped for receiving said second tubular member cross-sectional profile.

5. A telescopic propeller shaft according to claim 4, wherein one of said cardan joint and said another cardan joint is a terminal cardan joint.

6. A telescopic propeller shaft according to claim 2, wherein said plane of symmetry of two opposing projections forms, with said another plane of symmetry, two angles which differ from each other by approximately 10°.

7. A telescopic propeller shaft according to claim 2, wherein said plane of symmetry of two opposing projections forms, with said another plane of symmetry, an angle of approximately 95° and an angle of approximately 85°.

8. A telescopic propeller shaft according to claim 2, wherein outer surfaces of said wall portions of said symmetrical and outwardly converging projections form an angle of approximately 30° with each other.

9. A telescopic propeller shaft according to claim 4, wherein inner surfaces of said wall portions of said symmetrical and outwardly converging projections form an angle of approximately 28°30' with each other.

* * * * *